(12) United States Patent
Reddy et al.

(10) Patent No.: US 8,557,024 B2
(45) Date of Patent: Oct. 15, 2013

(54) CONFIGURATIONS AND METHODS OF CARBON CAPTURE

(75) Inventors: Satish Reddy, Irvine, CA (US); Sunil Vyas, Laguna Niguel, CA (US); Jeffrey Scherffius, Aliso Viejo, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 420 days.

(21) Appl. No.: 12/940,305

(22) Filed: Nov. 5, 2010

(65) Prior Publication Data

US 2011/0271714 A1 Nov. 10, 2011

Related U.S. Application Data

(62) Division of application No. 10/550,054, filed as application No. PCT/US2004/010248 on Apr. 2, 2004, now abandoned.

(60) Provisional application No. 60/460,363, filed on Apr. 3, 2003.

(51) Int. Cl.
*B01D 53/14* (2006.01)

(52) U.S. Cl.
USPC ......... 95/92; 95/228; 95/235; 95/231; 62/606

(58) Field of Classification Search
None
See application file for complete search history.

(56) References Cited

U.S. PATENT DOCUMENTS

| 4,270,937 A * | 6/1981 | Adler et al. .................. 62/625 |
| 4,449,994 A | 5/1984 | Hegarty et al. |
| 4,671,946 A * | 6/1987 | de Kraa et al. ............... 423/230 |
| 2002/0073845 A1 | 6/2002 | Reddy |

* cited by examiner

*Primary Examiner* — Duane Smith
*Assistant Examiner* — Phillip Shao
(74) *Attorney, Agent, or Firm* — Fish & Associates, PC

(57) ABSTRACT

An IGCC plant has a precombustion decarbonization unit in which acid gas is removed from a combustion gas before the combustion gas enters a combustion turbine. In one preferred configuration, a sulfur removal unit removes hydrogen sulfide from a feed gas before the desulfurized feed gas enters an autorefrigeration unit in which carbon dioxide is removed. In another preferred configuration, hydrogen sulfide is converted to carbonyl sulfide in a dryer, and the carbonyl sulfide is absorbed in the liquid carbon dioxide that is prepared from the feed gas using autorefrigeration.

5 Claims, 8 Drawing Sheets

CONFIGURATIONS AND METHODS OF CARBON CAPTURE

This application is a divisional of U.S. application Ser. No. 10/550,054 filed Jul. 5, 2006, which is a U.S. national phase of application PCT/US04/10248 filed Apr. 2, 2004, which is a non-provisional of application Ser. No. 60/460,363, filed Apr. 3, 2003, and which is incorporated by reference herein.

FIELD OF THE INVENTION

The field of the invention is acid gas removal from a feed gas, and especially removal of acid gases from syngas before syngas combustion (precombustion decarbonization).

BACKGROUND OF THE INVENTION

Gasification of various feeds is often integrated with a combined-cycle power unit to form an IGCC plant that typically exhibits relatively high efficiency for generation of electric power from relatively low-value carbonaceous feedstocks. The flue gas from the combustion turbine of such IGCC plants typically contains approximately 2-4% carbon dioxide, which has frequently been released into the atmosphere. However, since venting carbon dioxide into the atmosphere is now believed to have a negative impact on the earth's climate, various attempts have been made to remove carbon dioxide from the flue gas of IGCC and other plants.

For example, a typical configuration for an IGCC plant is depicted in Prior Art FIG. 1, in which carbon dioxide from the combustion turbine flue gas is removed using post-combustion absorption of carbon dioxide in a solvent. There are numerous configurations and methods for carbon dioxide removal known in the art, and exemplary methods are described, for example, in *Recovery of CO2 from Flue Gases: Commercial Trends* by D. Chapel, et al. (presented at 49th CSChE Conference, Saskatoon, Saskatchewan, Canada, 3-6 Oct., 1999). However, all or almost all of these processes tend to be expensive and energy inefficient due to the relatively low carbon dioxide partial pressures in the flue gas.

In another example, acidic gases are removed from raw synthesis gas prior to combustion as described in U.S. Pat. No. 6,090,356 to Jahnke et al., advantageously allowing concentration and separate recovery of $H_2S$, COS, and $CO_2$, which is used as a moderator with the purified syngas in a combustion turbine. However, separating $H_2S$ and COS from the synthesis gas still requires a liquid solvent, from which $CO_2$ is removed by stripping the solvent with nitrogen. Consequently, such processes still remain relatively expensive, especially due to the solvent regeneration.

Alternatively, carbon dioxide may be removed using a solid phase adsorbent. There are various solid phase adsorbents known in the art, and exemplary adsorbents and methods are described in U.S. Pat. No. 3,511,595 to Fuchs (alkali metal carbonate coated on a high surface area carrier), U.S. Pat. No. 3,865,924 to Gidaspow et al. (alkali metal carbonate ground together with alumina), or U.S. Pat. No. 4,433,981 to Slaugh et al., (calcined oxide or decomposable salt of an alkali metal or alkaline earth metal). While use of solid phase adsorbents is generally less expensive or environmentally problematic than solvent based absorption, regeneration of solid phase adsorbents typically requires heating in a temperature swing operation, thereby significantly increasing energy consumption of the plant.

Consequently, although various configurations and methods for carbon dioxide removal are known in the art, all or almost all of them suffer from one or more disadvantages. Thus, there is still a need to provide methods and configurations for improved carbon dioxide removal, and especially from IGCC gases.

SUMMARY OF THE INVENTION

The present invention is directed to configurations and methods of acid gas removal from a feed gas, and especially removal of carbon dioxide and hydrogen sulfide from syngas. In most preferred aspects, the hydrogen sulfide in the feed gas is converted to carbonyl sulfide (COS), which is then absorbed from feed gas using liquefied carbon dioxide that is prepared from the carbon dioxide present in the feed gas.

In one aspect of the inventive subject matter, a gas processing plant includes an absorber in which liquid carbon dioxide that is produced from carbon dioxide contained in a feed gas absorbs carbonyl sulfide that is produced from hydrogen sulfide contained in the feed gas. In such a plant, the carbonyl sulfide is preferably formed from the hydrogen sulfide in a dryer, wherein the dryer is coupled fluidly and upstream to the absorber.

In another aspect of the inventive subject matter, a plant includes a dryer comprising a desiccant and configured to receive a feed gas comprising hydrogen sulfide and carbon dioxide, wherein the desiccant has sufficient water affinity to convert at least part of the hydrogen sulfide to carbonyl sulfide. A source of liquid carbon dioxide is fluidly coupled to an absorber and configured to provide liquid carbon dioxide to the absorber, wherein the absorber is further fluidly coupled to the dryer and configured to receive the carbonyl sulfide and carbon dioxide such that the liquid carbon dioxide in the absorber absorbs at least part of the carbonyl sulfide.

The feed gas in preferred plants preferably comprises syngas, wherein the syngas is provided by a shift converter that is coupled fluidly and upstream to the absorber. A separator is preferably coupled fluidly and downstream to the absorber, wherein the separator is further configured to separate the carbonyl sulfide from the liquid carbon dioxide. Furthermore, it is generally contemplated that the liquid carbon dioxide is provided by an autorefrigeration unit that is coupled fluidly and downstream to the absorber (wherein the autorefrigeration unit may produce a hydrogen containing gas that is optionally provided to a combustion turbine). Additionally, or optionally, contemplated plants will include a pressure swing adsorption unit that is fluidly coupled to the autorefrigeration unit and that receives at least part of the hydrogen containing gas. A second autorefrigeration unit that receives an offgas from the pressure swing adsorption unit may further be included.

In a still further contemplated aspect of the inventive subject matter, a plant includes a membrane separator that receives a sulfur-depleted syngas and separates hydrogen from a carbon dioxide-containing reject gas. An autorefrigeration unit is preferably fluidly coupled to the membrane separator and receives the carbon dioxide-containing reject gas, wherein the autorefrigeration unit produces a carbon dioxide product and a hydrogen-containing offgas, and a combustion turbine receives the hydrogen and hydrogen-containing offgas.

In preferred aspects of such plants, a solvent-based sulfur removal unit produces the sulfur-depleted syngas from a shifted syngas, and/or a compressor is operationally coupled to an expander, wherein the compressor compresses the hydrogen and wherein the expander expands the carbon dioxide-containing reject gas. A pressure swing adsorption unit that receives at least part of the hydrogen may further be included.

Various objects, features, aspects and advantages of the present invention will become more apparent from the following detailed description of preferred embodiments of the invention.

BRIEF DESCRIPTION OF THE DRAWING

Prior Art

DETAILED DESCRIPTION

Figure 1:
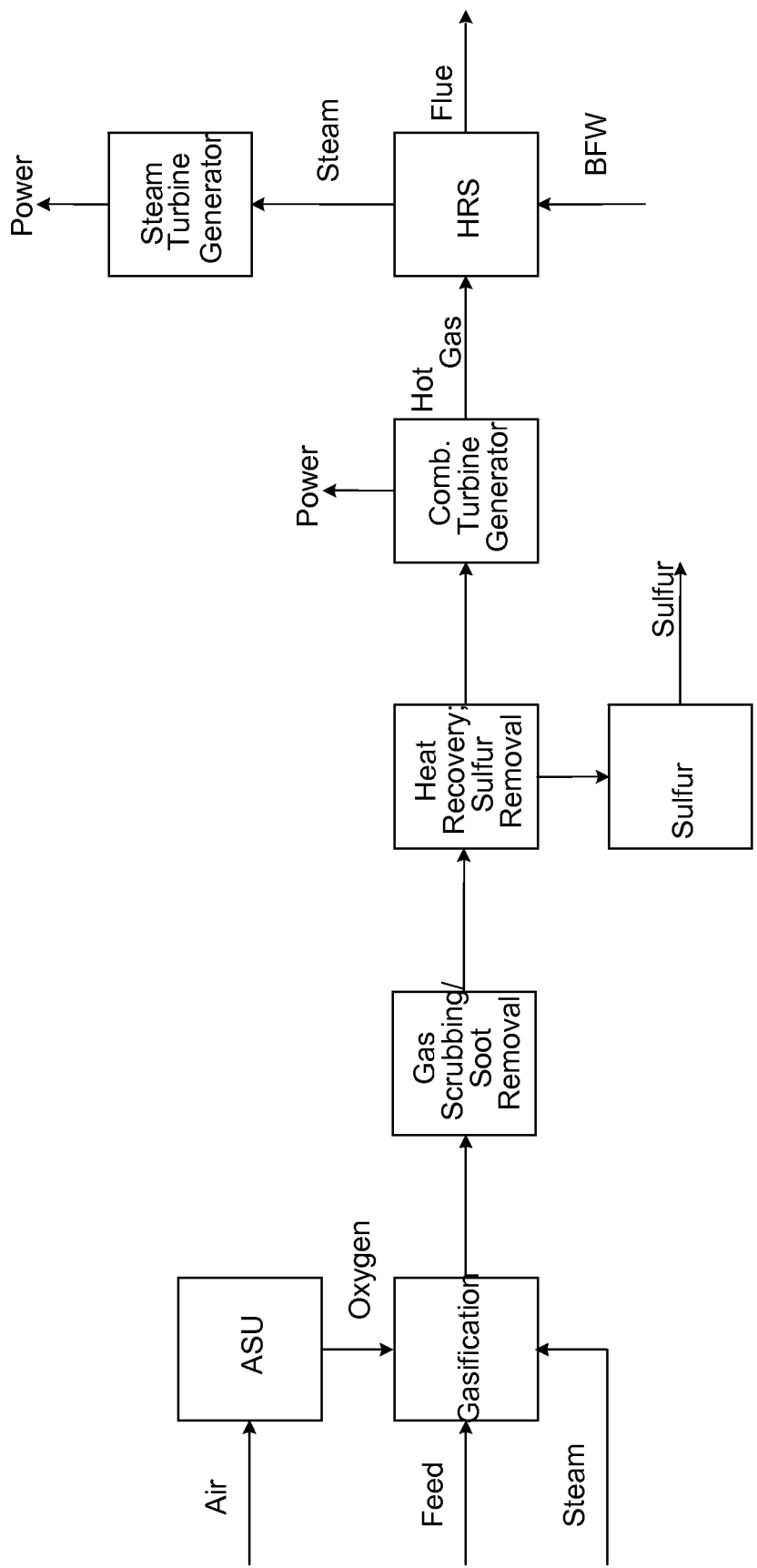
FIG. 1 is a schematic diagram of a known IGCC plant in which sulfur is removed prior to combustion of the feed gas, and in which carbon dioxide is removed after combustion of the feed gas.

The inventors discovered that acid gases, and especially sulfur compounds and carbon dioxide can be effectively removed from a feed gas using autorefrigeration before the feed gas is combusted. Contemplated configurations advantageously reduce emission of pollutants that otherwise would have to be removed from flue gases at relatively low concentrations and pressure, thereby providing a more cost and energy efficient solution for decarbonization. In preferred configurations, the feed gas is IGCC syngas and the decarbonization is operationally coupled to sulfur removal from the feed gas before combustion of the processed syngas.

In a further preferred aspect of the inventive subject matter, syngas is conventionally formed using one or more gasification or partial oxidation units (typically using steam and oxygen), all of which are well known in the art. For example, suitable gasification reactors may include a reaction zone and a quench zone as described in U.S. Pat. No. 2,809,104 to Strasser et al., which is incorporated herein by reference. A burner may be used to introduce the feed streams into the reaction zone, where the contents will commonly reach temperatures in the range of about 1700° F. to about 3000° F. at a pressure between about 1 psi to about 3700 psi. U.S. Pat. No. 3,945,942 to Marion et al. describes a partial oxidation burner, and U.S. Pat. No. 5,656,044 to Bishop et al. describes methods and apparatus for the gasification of organic materials. Further known gasification processes are described in U.S. Pat. No. 5,435,940 to Doering et al., U.S. Pat. No. 4,851,013 to Luke, and U.S. Pat. No. 4,159,238 to Schmid, all of which are incorporated by reference herein.

The so produced syngas is then preferably sent to a shift reactor where additional hydrogen and carbon dioxide are created from steam and carbon monoxide to form a shifted syngas comprising considerable quantities of hydrogen and carbon dioxide. In still further preferred aspects, heat recovery is employed to extract energy from the shifted syngas, and it should be appreciated that all known manners of heat recovery from shifted syngas are deemed suitable for use herein. For example, suitable shift reactors and configurations may be employed in a low-temperature shift reaction or a high-temperature shift reaction, and may further include use of a shift catalyst (e.g., metal oxide catalyst). Furthermore, the shift reaction may also be carried out in liquid phase as described in U.S. Pat. No. 4,980,145 to Hsiung, which is incorporated by reference herein.

As most syngas in IGCC plants contain considerable amounts of hydrogen sulfide, a sulfur removal unit is typically required to prevent undesired emission of noxious gases and corrosion in the piping. Furthermore, if CO2 recovery is desired, the hydrogen sulfide must also be removed from the CO2 product. Many IGCC facilities commonly use Selexol (or other physical solvent) or MDEA (or other chemical solvent) to selectively remove hydrogen sulfide, which is then sent to a sulfur plant where elemental sulfur is produced. In contrast, in contemplated configurations carbon dioxide is removed via autorefrigeration, which is operationally coupled to sulfur removal, and various configurations are contemplated herein.

Hydrogen Sulfide Removal with Conventional Solvent or Membrane Process

Figure 2:
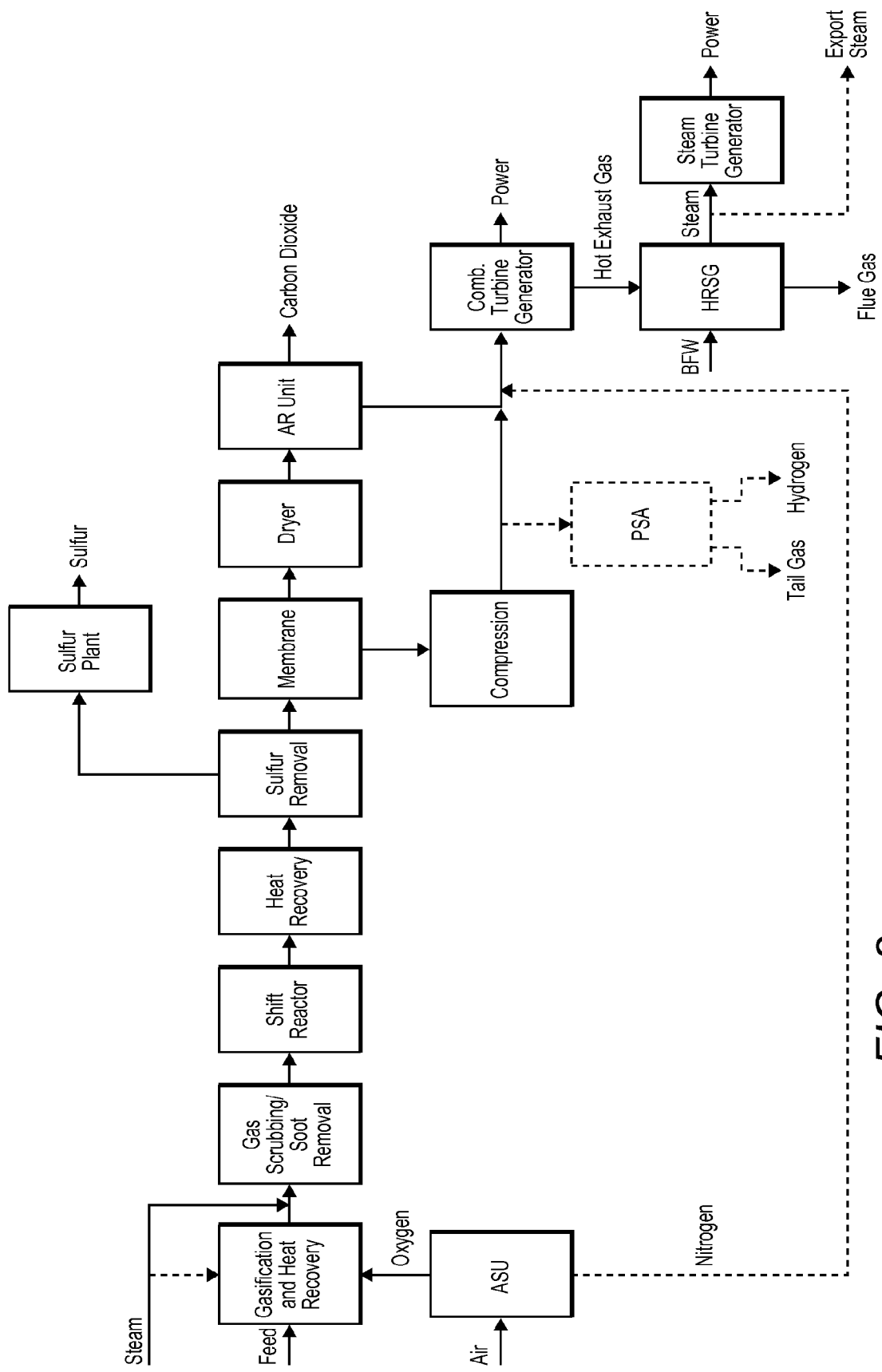
FIG. 2 is one exemplary configuration for precombustion decarbonization in which hydrogen sulfide and carbon dioxide are sequentially removed using solvent absorption and a membrane separation process.

In one especially preferred configuration, as schematically depicted in FIG. 2, the sulfur-containing compounds are removed from the shifted syngas using a solvent-based process in which the solvent (physical, chemical, or mixture thereof) is preferably selective towards hydrogen sulfide. While the so removed sulfur-containing compounds are processed in a sulfur plant (typically operating a Claus process or modification thereof), the shifted and desulfurized syngas is passed through a membrane unit to separate hydrogen from a carbon dioxide-rich reject gas, which is dried and liquefied using an autorefrigeration process. The hydrogen from the membrane unit is recompressed and then fed (optionally in combination with the autorefrigeration unit offgas) to the turbine combustor, and/or further purified using a PSA. In most preferred aspects, the turbine combustor is operationally coupled to a generator that produces electrical energy, and heat of the flue gas is extracted using a heat recovery steam generator (HRSG) that forms high pressure steam to drive a steam turbine generator.

It should be recognized that all known sulfur removal processes are suitable for use in conjunction with the teachings presented herein, and may therefore include solvent-based processes, membrane-based processes, and/or adsorption-based processes. For example, where the sulfur-containing compounds are removed using a solvent, suitable sulfur removal processes are described in U.S. Pat. Nos. 5,240,476 and 4,957,515 to Hegarty, U.S. Pat. No. 4,714,480 to Wansink, and U.S. Pat. No. 4,568,364 to Galsatun, all of which are incorporated by reference herein. Similarly, there are numerous membrane separation devices known in the art that can separate hydrogen sulfide from a gas stream, all of which are deemed suitable for use herein (see e.g., U.S. Pat. No. 4,654,063 to Auvil et al., U.S. Pat. Nos. 5,320,650 and 5,393,324 to Simmons, U.S. Pat. No. 5,820,659 to Eikner et al., and U.S. Pat. No. 6,503,295, all of which are incorporated by reference herein).

With respect to suitable autorefrigeration processes, it is contemplated that all known configurations and methods for autorefrigeration are deemed suitable for use herein. For example, contemplated autorefrigeration processes and configurations include those described by Reddy in U.S. Pat. Nos. 6,301,927, 6,500,241, and 6,551,380, all of which are incorporated by reference herein.

Figure 3:
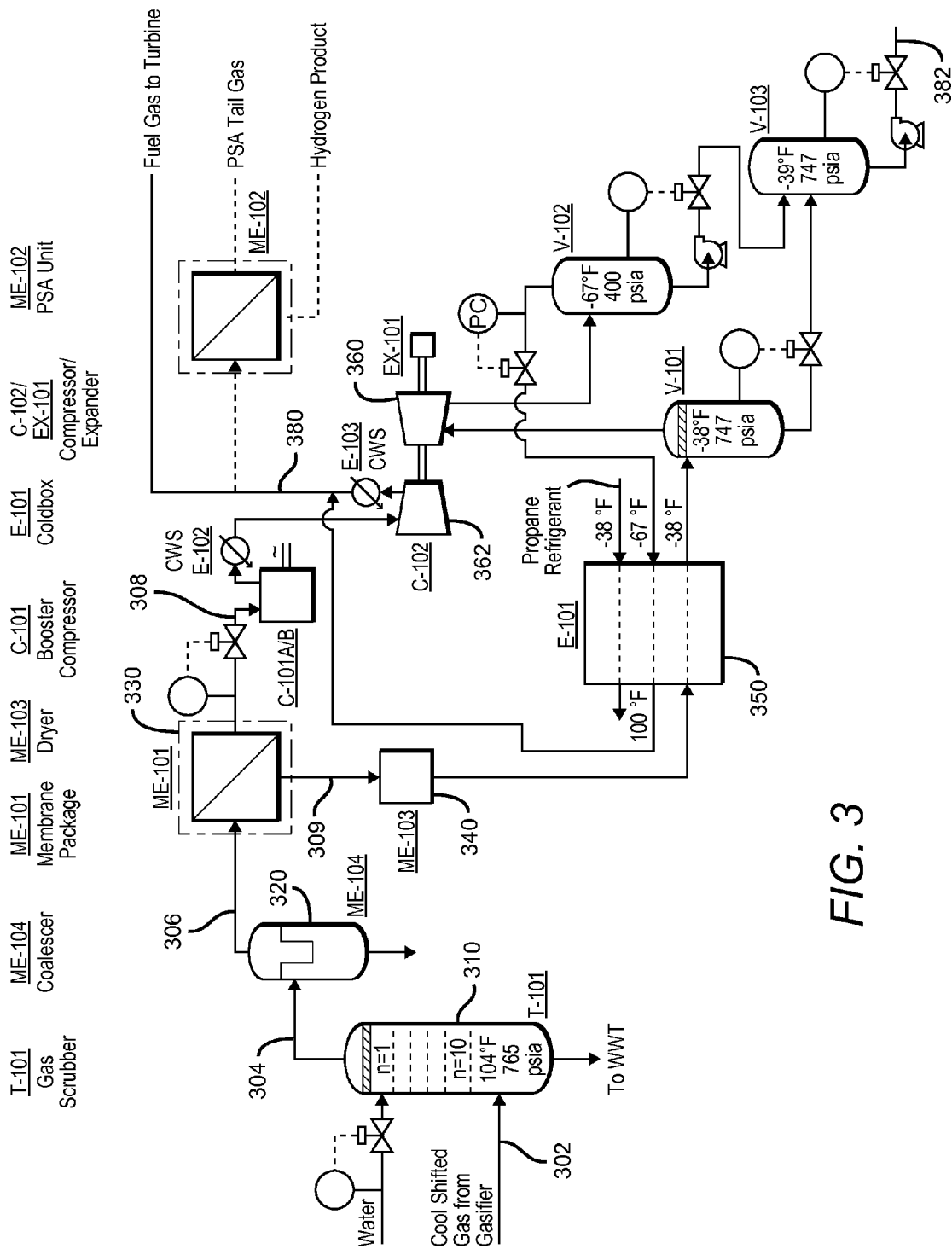
FIG. 3 is a schematic of a detailed view of the exemplary configuration of FIG. 2.

FIG. 3 provides a more detailed view of the integration of autorefrigeration in the precombustion decarbonization process of FIG. 2. Here, the shifted and desulfurized syngas 302 is washed with water in scrubber 310, and the washed syngas 304 is further processed in coalescer 320 to remove fine particulate matter. The so processed syngas 306 is then fed to the membrane package 330 where the high operating pressure of the syngas is advantageously utilized to produce a permeate gas 308. The permeate gas 308 is rich in hydrogen and has a pressure of about 100 psia. The residual gas stream 309, enriched in carbon dioxide, does not permeate the membrane and is sent to dryer 340 to remove any existing moisture.

From the dryer 340, the residual gas stream is cooled in heat exchanger 350 (e.g., with an external refrigerant and an offgas vapor) and separated into a liquid $CO_2$ portion and a vapor portion, which is further expanded in expander 360. The expanded vapor portion is again separated to form a second liquefied $CO_2$ product, which is combined to form liquefied CO2 stream 382, and a hydrogen-containing offgas that is employed in the heat exchanger 350 as internal refrigerant before being sent to the combustion turbine as fuel 380 and/or to a PSA unit as a hydrogen source feed. It should be especially appreciated that the expansion energy recovered from the residual gas stream can be advantageously used in recompression of the hydrogen-rich permeate 308 in compressor 362. The so compressed hydrogen-rich permeate may then be combined with the hydrogen-containing offgas and used as fuel in a combustion turbine and/or in a PSA unit as a hydrogen source feed.

Therefore, it should be recognized that the autorefrigeration process provides two product streams from the syngas, a hydrogen rich offgas stream 380 and a liquefied carbon dioxide stream 382 (infra), capturing about 70% of the total carbon dioxide in the shift effluent. This carbon dioxide can be pumped to approximately 2000 psia and used for Enhanced Oil Recovery (EOR). It should further be appreciated that at least part of the CO2 can also be employed as a refrigerant (e.g., in a cold box or exchanger 350 to reduce power consumption). The permeate gas from the membrane is re-compressed to approximately 350 psia and mixed with the hydrogen-rich stream from the autorefrigeration process. As the power required to compress hydrogen is considerable, the pressure can be varied depending on the operating pressure desired in the combustion turbine. Alternatively, or additionally, the permeate gas can be sent to a PSA if hydrogen recovery is desired.

Still further, it should be appreciated that configurations and methods according to the inventive subject matter do not require a solvent based amine unit to capture carbon dioxide in the syngas. Instead, contemplated configurations and processes use external refrigeration and expansion to generate the product streams. When compared to a conventional amine unit, contemplated autorefrigeration systems save on power per ton of carbon dioxide captured and system maintenance.

Hydrogen Sulfide Removal Via COS Absorption

Alternatively, carbon dioxide that is removed from the syngas in the autorefrigeration processes may also be employed as an absorbent for COS, which—in the presence of carbon dioxide—can be formed from hydrogen sulfide via dehydration according to equation (I).

$$H_2S + CO_2 \leftrightarrow COS + H_2O \tag{I}$$

Thus, viewed from another perspective, precombustion decarbonization may include conversion of hydrogen sulfide to COS and absorption of the so formed COS by liquid carbon dioxide which was previously isolated from the syngas using autorefrigeration. It should be especially appreciated that COS has a relatively low corrosivity (if any) to carbon steel and can therefore be tolerated in relatively high amounts in a carbon dioxide product stream.

Figure 4:
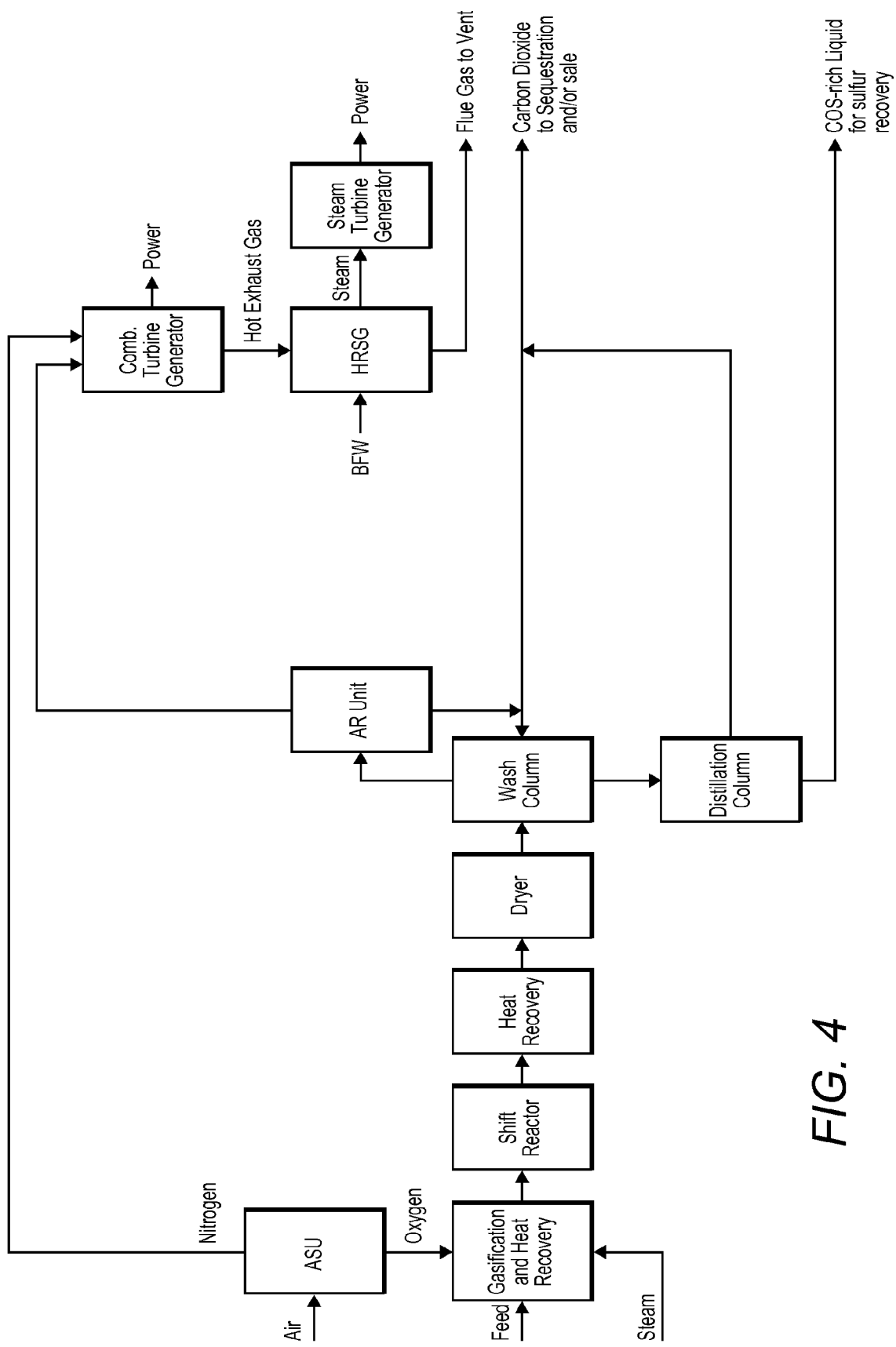
FIG. 4 is another exemplary configuration for precombustion decarbonization in which hydrogen sulfide and carbon dioxide are sequentially removed using liquid carbon dioxide and an autorefrigeration process.

Therefore, in one preferred aspect, as schematically depicted in FIG. 4, a shifted syngas is formed in a gasification unit (or partial oxidation unit) that is coupled to one or more shift reactors using configurations and methods as described for the configuration of FIG. 2 above. The so produced shifted syngas predominantly comprises hydrogen, carbon dioxide, carbon monoxide, water, and hydrogen sulfide.

Water is then removed from the shifted syngas using a dryer, and all known dryers are contemplated suitable for use herein. For example, contemplated dryers may include a unit in which the shifted syngas gas is cooled to a temperature below the dew point of water by internal and/or external refrigeration. The so pre-dried gas (or non-pre-dried gas) is then preferably dehydrated by contact with a desiccant, and all known desiccants are considered suitable for use herein. For example, contemplated desiccants include molecular sieves and/or alumina desiccants. In still further preferred aspects, the desiccant is further coated with a COS hydrolysis catalyst (e.g., gamma alumina coated with an alkali metal oxide). As COS hydrolysis is an equilibrium process (see equation (I) above), it should be recognized that by continuous removal of water from a hydrogen sulfide-containing shifted syngas in the desiccant bed, the reaction shifts from COS hydrolysis towards the production of COS and additional water (which is removed by the desiccant). Therefore, under preferred conditions in contemplated configurations, the hydrogen sulfide in the syngas is converted to COS under concomitant removal of water, and the resulting dried syngas will then predominantly include hydrogen, carbon dioxide, COS, and carbon monoxide.

In most preferred aspects of the inventive subject matter, the so obtained dried syngas is then cooled and sent to a column in which liquid $CO_2$ "washes" the syngas to substantially absorb all of the COS from dried syngas (i.e., at least 75%, more typically at least 90%, and most typically at least 98%). Such favorable desulfurization is achieved mostly due to the fact that COS is significantly more soluble in $CO_2$ than hydrogen sulfide. Consequently, another advantage in such configurations is that $CO_2$ liquid will be required for the washing step. The column produces a mixed liquid stream of COS and $CO_2$, while the overhead vapor from the column, now substantially depleted of COS, is further processed in an autorefrigeration unit for removal of the remaining carbon dioxide in the desulfurized syngas. It should be especially appreciated that the autorefrigeration process also produces a liquid $CO_2$ stream that can be used in the column for COS absorption. The mixed liquid stream of COS and $CO_2$ from the column can then be separated in a conventional distillation column in which COS is separated as a bottom product, and in which $CO_2$ is recycled back to the column, routed to the $CO_2$ captured in the decarbonization, or sequestered separately. Where pure hydrogen and further $CO_2$ removal are not desired, the desulfurized and decarbonized offgas from the autorefrigeration unit can be sent as fuel to the gas turbines as shown in FIG. 4, in which the flue gas from the combustion turbine is further used in an HRSG and steam turbine for energy generation.

Figure 5:
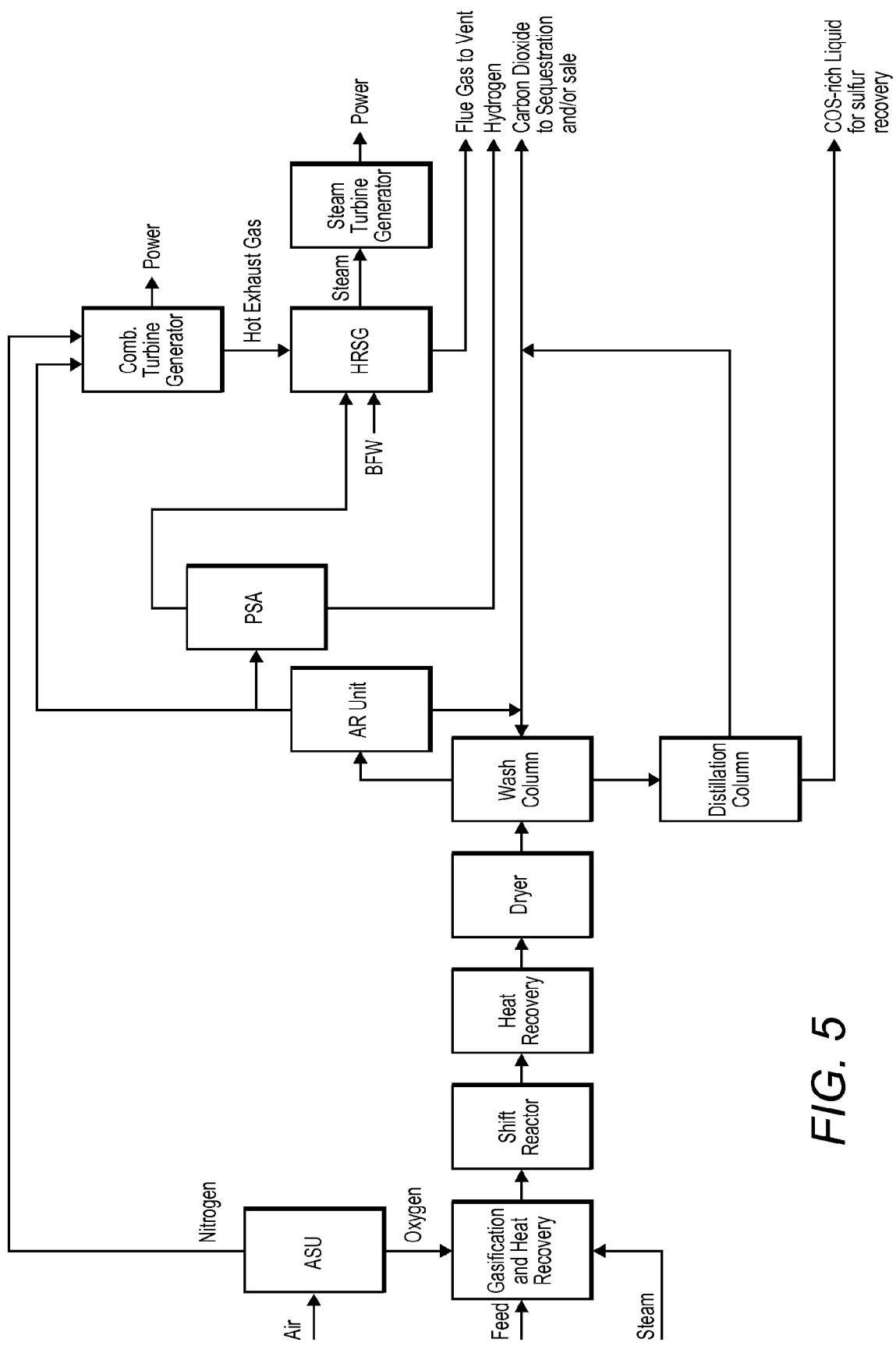
FIG. 5 is a further exemplary configuration for precombustion decarbonization in which hydrogen sulfide and carbon dioxide are sequentially removed using liquid carbon dioxide and an autorefrigeration process, and further including a PSA unit.
Figure 6:
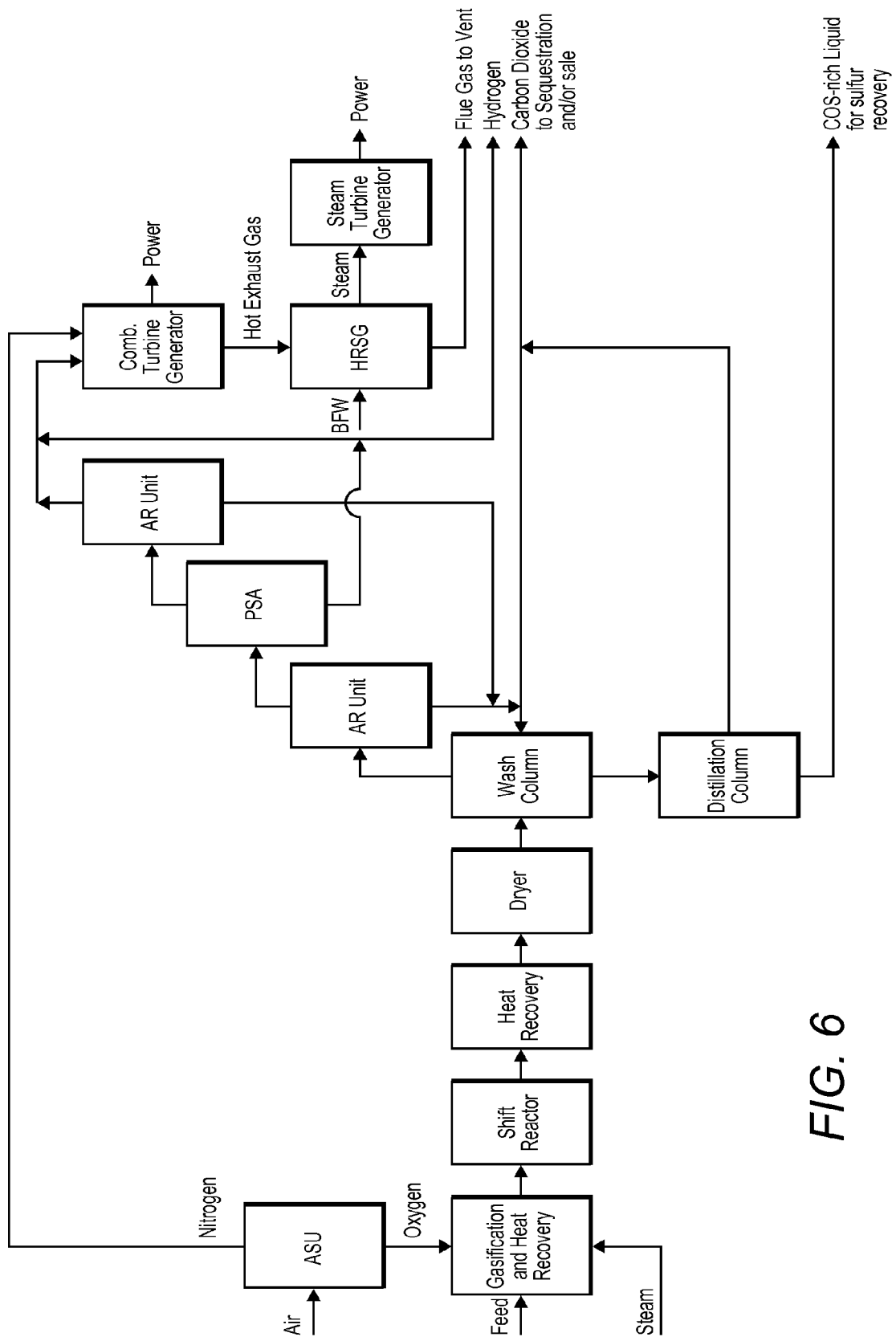
FIG. 6 is a further exemplary configuration for precombustion decarbonization in which hydrogen sulfide and carbon dioxide are sequentially removed using liquid carbon dioxide and an autorefrigeration process, and further including a PSA and a second autorefrigeration unit.

On the other hand, where pure hydrogen (i.e., purity>99%) is desired as a product, the desulfurized and decarbonized syngas (which is now approximately 74% hydrogen), can be sent to a PSA in which approximately 85-90% of the hydrogen is recovered as pure hydrogen (if no further $CO_2$ recovery is desired, only a portion of the syngas is sent to the PSA—the remaining syngas can be sent as fuel to the gas turbines and the off-gas from the PSA can be used for duct burning in the HRSG as depicted in FIG. 5). Alternatively, as depicted in FIG. 6, it is contemplated that the PSA off-gas may also be compressed and recycled back to a second autorefrigeration process for further $CO_2$ recovery. The so obtained liquid $CO_2$ can then be combined with the CO2 of the first autorefrigeration process. Thus, where high $CO_2$ recovery is desired, the entire desulfurized and decarbonized syngas stream from the first autorefrigeration process may be sent to the PSA. In such configurations, a portion of the pure hydrogen can then be exported as a hydrogen product. The off-gas from the PSA now contains mostly $CO_2$ and, after compression, can be sent to the second autorefrigeration process for further CO2 recovery. The off-gas from the second autorefrigeration process is then mixed with the remaining hydrogen from the PSA and sent to the combustion turbines.

Figure 7:
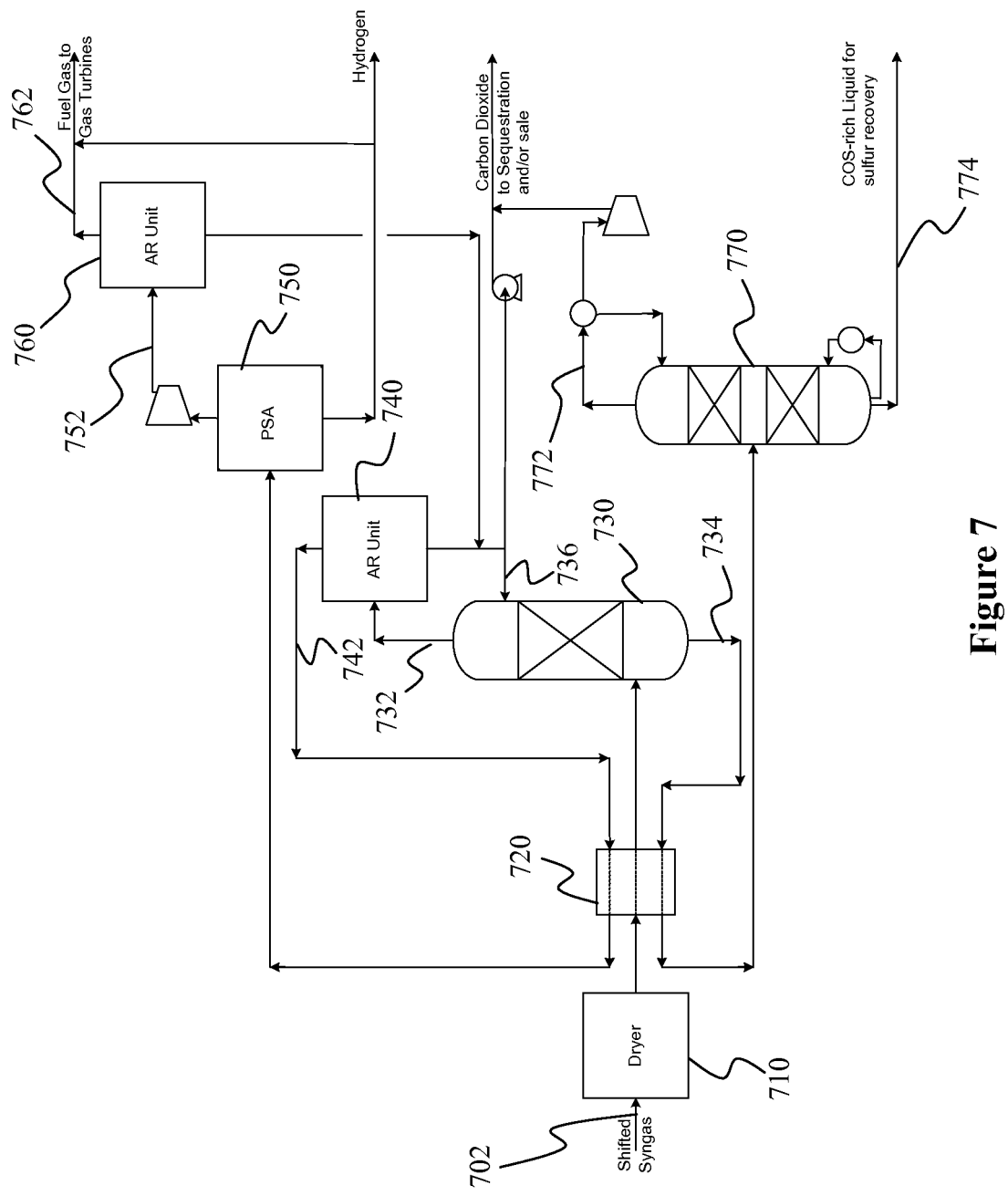
FIG. 7 is a schematic of a detailed view of the exemplary configuration of FIG. 4.

A detailed schematic view of the configuration of FIG. 6 starting at the dryer and including further downstream components is provided in FIG. 7. Here, shifted syngas 702 is fed into the dryer 710 in which the hydrogen sulfide from the shifted syngas is converted to COS. The so shifted and dried syngas is then cooled in heat exchanger 720 using the refrigeration content of the bottom stream 734 from absorber column 730 and the refrigeration content of the offgas 742 from the autorefrigeration unit 740.

The cooled, shifted and dried syngas is then fed into absorber column 730 and liquid carbon dioxide stream 736 is used to wash the shifted and dried syngas, thereby absorbing the COS from the shifted and dried syngas. Bottom stream 734 comprising a mixture of $CO_2$ and COS is routed through heat exchanger 720 before entering separator 770 in which COS is separated in bottom stream 774 from carbon dioxide in overhead stream 772. The absorber overhead 732 comprising desulfurized syngas is then fed into the first autorefrigeration unit 740 in which carbon dioxide is removed and may be recycled to absorber column 730 (or routed to carbon dioxide sequestration, or sold as a product).

Autorefrigeration unit 740 further produces a desulfurized and decarbonized syngas 742 from the desulfurized syngas, and hydrogen is purified from syngas 742 in a PSA unit 750. The PSA produces pure hydrogen, and PSA offgas 752 can then be further decarbonized in the second autorefrigeration unit 760, wherein the isolated carbon dioxide is combined with the other carbon dioxide stream of the first autorefrigeration unit 740 (which may be used in the absorber or other $CO_2$ sink). Stream 762 leaving the second autorefrigeration unit may then be employed as fuel in a gas turbine.

Figure 8:
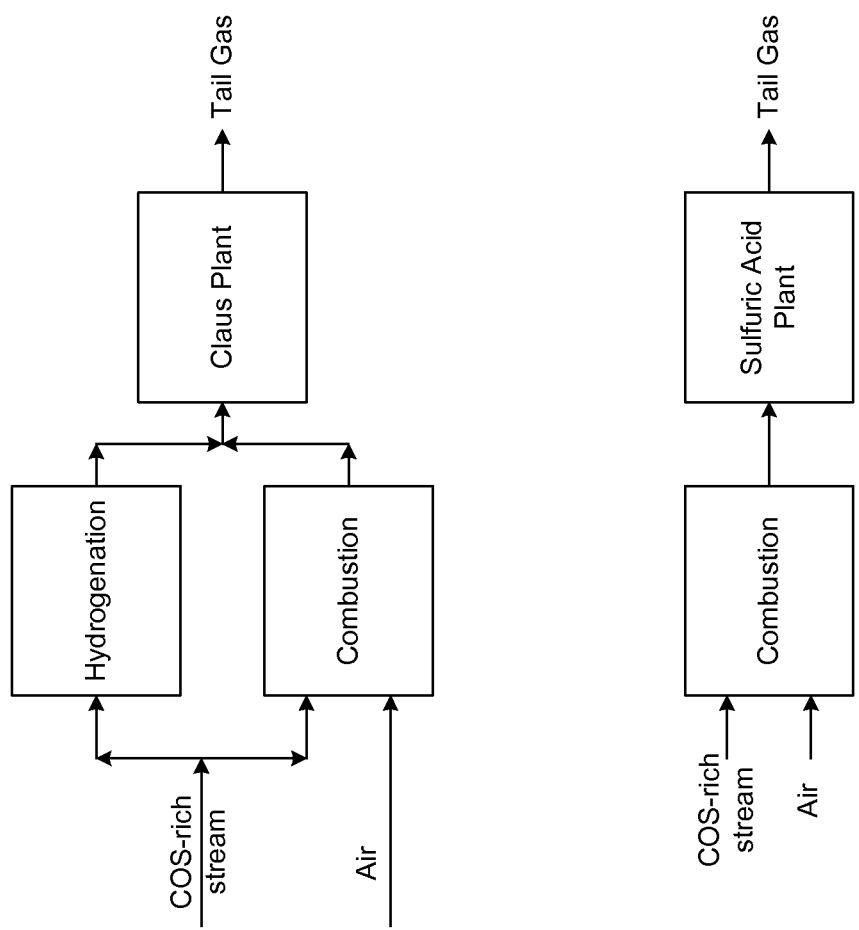
FIG. 8 is a schematic of a detailed view of contemplated alternative COS disposal options.

With respect to further disposal of COS, numerous manners of COS destruction and/or conversion are known in the art, and all of the known manners are deemed suitable for use herein. For example, as schematically depicted in FIG. 8, COS may be hydrogenated to form hydrogen sulfide and other byproducts that are then processed in a Claus plant to form elemental sulfur. Similarly, COS may also be combusted using air to form sulfur oxides that are also routed to the Claus plant to form elemental sulfur. Alternatively, or additionally, COS may be oxidized using combustion with air to form sulfur dioxide, which is then fed to a sulfuric acid plant.

Of course it should be appreciated that various alternatives to the configurations and methods presented herein are also contemplated. For example, where purity of the separated carbon dioxide is not critical, the separator that separates carbon dioxide from COS may be omitted and the $CO_2$/COS mixture may be directly used (e.g., for enhanced oil recovery). Furthermore, with respect to the source of the carbon and sulfur-containing gas it should be recognized that contemplated configurations need not be limited to IGCC syngas. Thus, it is generally contemplated that all gases that include hydrogen sulfide (and optionally carbon dioxide) are considered suitable for use herein.

Therefore, it should further be appreciated that the carbon dioxide for COS absorption is not limited to $CO_2$ isolated from feed gas, but external sources of $CO_2$ may also be used to absorb the COS. For example, any hydrogen sulfide containing gas may be desulfurized using conversion to COS, where that gas has no or a relatively low concentration of $CO_2$. In such cases, the $CO_2$ may be added (e.g., as recirculating liquid $CO_2$, or as added component into the gas stream). Furthermore, while contemplated configurations are particularly useful for carbon and sulfur capture from an IGCC syngas, the inventive concept presented herein may also be used to remove hydrogen sulfide from $CO_2$ to produce a food ingredient grade quality $CO_2$ product.

Thus, specific embodiments and applications of configurations and methods of carbon capture have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:
1. A method of removing hydrogen sulfide from shifted syngas, comprising:
   dehydrating and cooling the shifted syngas in an amount sufficient to convert the hydrogen sulfide in the shifted syngas to carbonyl sulfide;
   absorbing the carbonyl sulfide from the shifted syngas in an absorber using liquid carbon dioxide to produce a desulfurized syngas and a carbonyl sulfide containing liquid carbon dioxide product;
   feeding the desulfurized syngas into an autorefrigeration unit to form the liquid carbon dioxide from the desulfurized syngas and to further produce a desulfurized and decarbonized syngas;
   using refrigeration content in the desulfurized and decarbonized syngas and the carbonyl. sulfide containing liquid carbon dioxide product in the step of cooling the shifted syngas; and
   feeding the desulfurized and decarbonized syngas into a hydrogen pressure swing absorption (PSA) unit to produce a hydrogen product and a carbon dioxide-containing PSA offgas.

2. The method of claim 1 wherein the step of dehydrating the shifted syngas comprises contacting the shifted syngas with a desiccant that is coated with a carbonyl sulfide hydrolysis catalyst.

3. The method of claim 1 further comprising a step of feeding the carbonyl sulfide containing liquid carbon dioxide into a separator to thereby produce a carbonyl sulfide bottom stream and a carbon dioxide overhead vapor stream.

4. The method of claim 1 further comprising a step of feeding the carbon dioxide containing PSA offgas into a second autorefrigeration unit to produce a second liquid carbon dioxide stream.

5. The method of claim 4 further comprising a step of combining the second liquid carbon dioxide stream from the second autorefrigeration unit with the liquid carbon dioxide of the autorefrigeration unit.

* * * * *